(No Model.)

E. W. GRANT.
RUBBER BUCKET FOR CHAIN PUMPS.

No. 259,847. Patented June 20, 1882.

Witnesses:
W. C. McArthur
John C. Rogers

Inventor:
E. W. Grant
per
T. H. Alexander
Attorney

UNITED STATES PATENT OFFICE.

EDWARD W. GRANT, OF YPSILANTI, MICHIGAN.

RUBBER BUCKET FOR CHAIN-PUMPS.

SPECIFICATION forming part of Letters Patent No. 259,847, dated June 20, 1882.

Application filed April 4, 1882. (No model.)

*To all whom it may concern:*

Be it known that I, EDWARD W. GRANT, of Ypsilanti, in the county of Washtenaw and State of Michigan, have invented certain new and useful Improvements in Rubber Buckets for Chain-Pumps; and I do hereby declare that the following is a full, clear, and exact description thereof, reference being had to the accompanying drawings, and to the letters of reference marked thereon, which form part of this specification.

Figure 1:
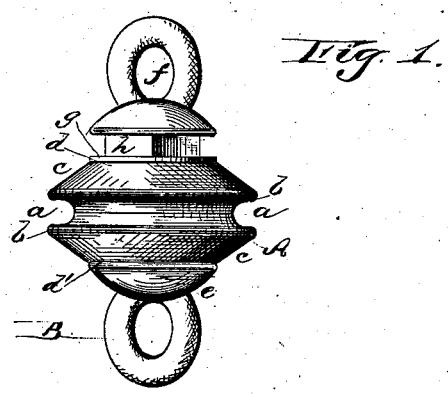
Figure 2:
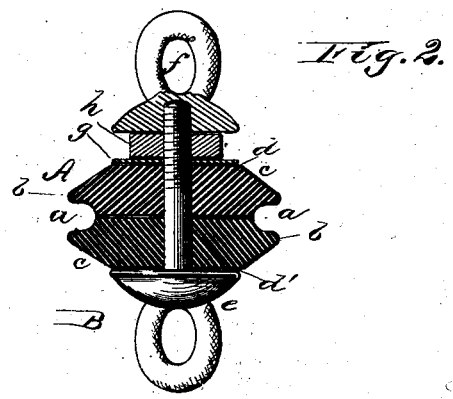

Figure 1 is a side elevation, and Fig. 2 a central vertical section, of my invention.

This invention relates to an improvement on chain-pump buckets which are made of vulcanized india-rubber; and the nature of my invention consists in a reversible double conical bucket having an annular groove formed in it in such manner as to leave two circular piston flanges or bearings for the bore of the pump-stock, and to obtain a water-packing between the flanges, said bucket being provided with means for expanding it in connection with the link, all as will be fully understood from the following description, when taken in connection with the annexed drawings.

The letter A designates the india-rubber part or body of the improved pump-bucket. The general outline of this bucket-body is represented by Figs. 1 and 2, which represent two frusta of cones with their bases together, and an annular groove, $a$, at said bases. This groove is of considerable depth, so as to leave two annular flanges, $b\ b$, having rounded edges well defined, which are designed to bear against the inner wall of a pump-stock. The groove between the flanges will become filled with water during the working of the pump, which will serve as a water-packing, and in a measure as a means for lubricating the parts. The beveled surfaces $c\ c$ afford more or less flexibility to the flanges $b\ b$, and these surfaces terminate in flattened surfaces $d\ d'$, between which the bucket is thickest, for affording material for expanding it diametrically.

B designates the link, which is composed of two parts. The part $e$ has a screw-stem, a flange, and an eye. The other part, $f$, consists of an eye, a flange, and a female-screw-threaded socket adapted to screw on the said stem.

Between the part $f$ and the body of the bucket is a washer, $g$, and a nut, $h$, the object of which latter is to allow the use of a wrench in compressing the body of the bucket to expand it diametrically. The part $f$ serves as a jam-nut for holding the nut $h$.

The bucket which I have described is not liable to leak its water when the pump is in operation, and for this reason a constant and full stream of water is discharged. Then, again, should one of the flanges $b$ become damaged, the other flange is left to do duty until a new bucket or flange is substituted.

Having described my invention, I claim—

1. The combination, in a pump-bucket, of the elastic body A, having bevels $c\ c$ and an intermediate groove, $a$, with the parts B, $e$, $h$, and $f$, all arranged and adapted to operate in the manner and for the purposes substantially as described.

2. In a reversible chain-pump bucket, the combination of two elastic frusta of cones whose bases are of equal diameter, having flanges of equal diameter between their bases, and an annular groove, $a$, with a link-clamping device, substantially in the manner and for the purposes described.

3. A rubber chain-bucket consisting of the following elements in combination: a double-beveled annularly-grooved portion, A, having flanges $b$ of equal diameter, the parts B $f$, the screw-stem on the part B, the prismatic nut $h$, and the washer $g$, all arranged and combined as an entirety, substantially as described.

In testimony that I claim the foregoing as my own invention I affix my signature in presence of two witnesses.

EDWARD W. GRANT.

Witnesses:
E. P. ALLEN,
THOMAS KISSANE.